United States Patent
Qin et al.

(10) Patent No.: US 8,916,639 B2
(45) Date of Patent: Dec. 23, 2014

(54) PAINT COMPOSITION AND COATED ARTICLE USING THE SAME

(71) Applicants: Shenzhen Futaihong Precision Industry Co., Ltd., Shenzhen (CN); FIH (Hong Kong) Limited, Kowloon (HK)

(72) Inventors: Yao-Yao Qin, Shenzhen (CN); Shu-Xiang Zhou, Shenzhen (CN); Qiu-Jiang Xu, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 13/928,513

(22) Filed: Jun. 27, 2013

(65) Prior Publication Data

US 2014/0148545 A1    May 29, 2014

(30) Foreign Application Priority Data

Nov. 26, 2012    (CN) .......................... 2012 1 0487004

(51) Int. Cl.
*C08K 3/34*    (2006.01)
*C09D 7/12*    (2006.01)

(52) U.S. Cl.
CPC ............ *C09D 7/1225* (2013.01); *Y10S 977/773* (2013.01)
USPC .......................................... 524/493; 977/773

(58) Field of Classification Search
USPC .......................................................... 524/493
See application file for complete search history.

(56) References Cited

FOREIGN PATENT DOCUMENTS

| CN | 101987927 | * | 3/2011 | ................ C09C 1/28 |
| CN | 102504686 | * | 6/2012 | ........... C09D 175/04 |
| CN | 102581900 | * | 7/2012 | ................ B27K 3/52 |

* cited by examiner

*Primary Examiner* — Ling Choi
*Assistant Examiner* — Thuy-Ai Nguyen
(74) *Attorney, Agent, or Firm* — Novak Druce Connolly Bove + Quigg LLP

(57) ABSTRACT

A paint composition contains polyurethane paint and nano silicon dioxide. The weight percentage of the nano silicon dioxide in the paint composition is about 2% to about 10%. The surface of the nano silicon dioxide chemically bonds with a silane coupling agent having amino function groups or an aluminate coupling agent having amino function groups.

8 Claims, 1 Drawing Sheet

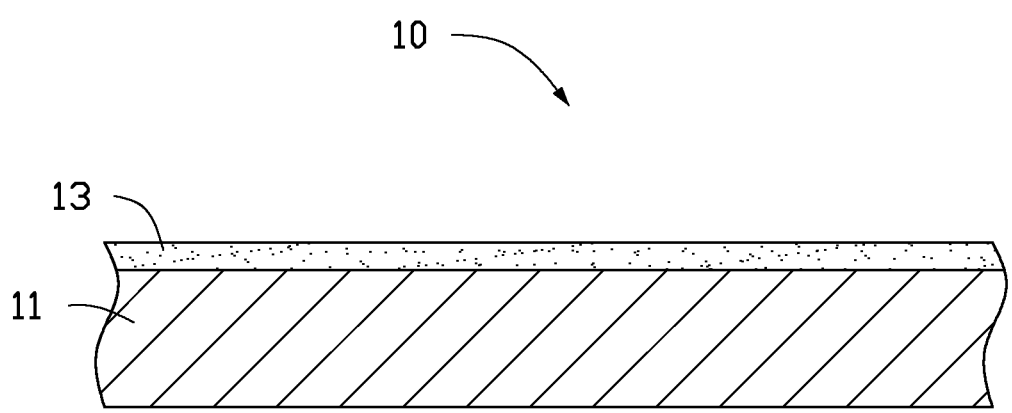

PAINT COMPOSITION AND COATED ARTICLE USING THE SAME

BACKGROUND

1. Technical Field

The present disclosure relates to a paint composition and a coated article using the paint composition.

2. Description of the Related Art

Typically, inorganic nano particles, such as nano silicon dioxide and nano titanium dioxide can be added to paint to improve the hardness of the paint layer. However, it can be difficult to uniformly disperse the inorganic nano particles in the paint because in the paint, the inorganic nano particles very easily aggregate. As a result, it is difficult to improve the physical properties of the paint by adding inorganic nano particles.

Therefore, there is room for improvement within the art.

BRIEF DESCRIPTION OF THE FIGURE

Many aspects of the coated article can be better understood with reference to the following drawing. The components in the drawing are not necessarily drawn to scale, the emphasis instead being placed upon clearly illustrating the coated article. Moreover, in the drawing like reference numerals designate corresponding parts throughout the several views.

FIG. 1 is an exploded view of an exemplary coated article.

DETAILED DESCRIPTION

A paint composition contains polyurethane paint and nano silicon dioxide, wherein the weight percentage of the nano silicon dioxide in the paint composition is about 2% to about 10%. In the exemplary embodiment, the weight percentage of the nano silicon dioxide in the paint composition is about 3% to about 5%.

The nano silicon dioxide has an average particle diameter of about 30 nm to about 80 nm. In the exemplary embodiment, the average particle diameter of the nano silicon dioxide is about 50 nm to about 60 nm.

Before adding to the polyurethane paint, the nano silicon dioxide can be modified in one of two ways to avoid the aggregation of the nano silicon dioxide in the polyurethane paint. The first way is that the nano silicon dioxide is modified to chemically bond with a silane coupling agent having amino function groups ($-NH_2$). The second way is that the nano silicon dioxide is modified to chemically bond with an aluminate coupling agent having amino function groups. Since the polyurethane paint also contains $-NH_2$, the modified nano silicon dioxide does not aggregate in the polyurethane paint, and disperse in the polyurethane paint steadily and uniformly.

The modified silicon dioxide is made by the following steps.

The nano silicon dioxide having a mass of about 2 g to about 6 g and organic solution are mixed together to get a mixture. Then a silane coupling agent having amino function groups or an aluminate coupling agent having amino function groups is added to the mixture, the silane coupling agent or the aluminate coupling agent added to the mixture have a volume of about 3 ml to about 10 m.

FIG. 1 shows a coated article 10 including a substrate 11 and a layer 13 formed on the substrate. The layer 13 is formed by coating the paint composition described above to the substrate and drying the paint composition at ambient temperature. The layer 13 contains polyurethane paint and nano silicon dioxide, wherein the weight percentage of the nano silicon dioxide in the paint composition is about 2% to about 10%. In the exemplary embodiment, the weight percentage of the nano silicon dioxide in the paint composition is about 3% to about 5%.

The nano silicon dioxide is modified by silane coupling agent having amino function groups or aluminate coupling agent having amino function groups. The nano silicon dioxide in the layer 13 can effectively improve the pencil hardness of the layer.

Example 1

In the exemplary embodiment, 3 g of nano silicon dioxide was dispersed in 20 ml of toluene to obtain a mixture. 5 ml of silane coupling agent having amino function groups was added to the mixture. The mixture was stirred for about 2 hours and the temperature of the mixture was kept at 110° C. during stirring. This temperature promotes the modification of the silicon dioxide. Finally, the mixture was filtered.

In the exemplary embodiment, 4 g of modified silicon dioxide was added in 96 g of polyurethane paint to obtain a paint composition.

A substrate 11 made of polycarbonate was provided. The paint composition was coated to one surface of the substrate 11 and dried at ambient temperature to form a layer 13. The pencil hardness of the layer 13 was H.

Example 2

In the exemplary embodiment, 3 g of nano silicon dioxide was dispersed in 20 ml of toluene to obtain a mixture. 5 ml of aluminate coupling agent having amino function groups was added to the mixture. The mixture was stirred for about 2.5 hours and the temperature of the mixture was kept at 65° C. during stirring. This temperature promotes the modification of the silicon dioxide. Finally, the mixture was filtered.

In the exemplary embodiment, 3 g of modified silicon dioxide was added in 97 g of polyurethane paint to obtain a paint composition.

A substrate 11 made of polycarbonate was provided. The paint composition was coated to one surface of the substrate and dried to form a layer 13. The pencil hardness of the layer 13 was H.

COMPARATIVE EXAMPLE

A paint composition which only contains polyurethane paint was provided. The paint composition was coated to one surface of a substrate made of polycarbonate. The pencil hardness of the layer was B. Thus, the pencil hardness of the layer in the comparative example is lower than the pencil hardness of the layers in examples 1 and 2.

It is to be understood that even though numerous characteristics and advantages of the present embodiments have been set forth in the foregoing description, together with details of assemblies and functions of various embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A paint composition, comprising:
   polyurethane paint; and
   nano silicon dioxide;
   wherein the weight percentage of the nano silicon dioxide in the paint composition is about 2% to about 10%, the nano silicon dioxide chemically bonds with an aluminate coupling agent having amino function groups.

2. The paint composition as claimed in claim 1, wherein the weight percentage of the nano silicon dioxide in the paint composition is about 3% to about 5%.

3. The paint composition as claimed in claim 1, wherein the nano silicon dioxide has an average particle diameter of about 30 nm to about 80 nm.

4. The paint composition as claimed in claim 3, wherein the nano silicon dioxide has an average particle diameter of about 50 nm to about 60 nm.

5. A coated article, comprising:
   a substrate; and
   a layer formed on the substrate;
   wherein the layer comprises polyurethane paint and a nano silicon dioxide, the nano silicon dioxide has an average particle diameter of about 30 nm to about 80 nm, the weight percentage of the nano silicon dioxide in the layer is about 2% to about 10%, the nano silicon dioxide chemically bonds with an aluminate coupling agent having amino function groups.

6. The coated article as claimed in claim 5, wherein the weight percentage of the nano silicon dioxide in the layer is about 3% to about 5%.

7. The coated article as claimed in claim 5, wherein the nano silicon dioxide has an average particle diameter of about 30 nm to about 80 nm.

8. The coated article as claimed in claim 7, wherein the nano silicon dioxide has an average particle diameter of about 50 nm to about 60 nm.

* * * * *